United States Patent

[11] 3,619,785

[72] Inventors Cecil W. Farrow
Monmouth Hills;
Louis N. Holzman, Lincroft, both of N.J.

[21] Appl. No. 836,741
[22] Filed June 26, 1969
[45] Patented Nov. 9, 1971
[73] Assignee Bell Telephone Laboratories, Incorporated
Murray Hill, Berkeley Heights, N.J.

[54] SYSTEM FOR DETECTING THE PRESENCE OF A RECEIVED DATA SIGNAL
1 Claim, 1 Drawing Fig.

[52] U.S. Cl. .......... 325/323, 325/478, 325/324
[51] Int. Cl. .......... Ho4h 1/10, H03g 5/100
[50] Field of Search .......... 325/323, 390, 321, 324, 478, 466, 417, 329, 330, 65, 49; 178/69.5 R; 179/15 P, 84 VF; 340/170

[56] References Cited

UNITED STATES PATENTS

| | | | |
|---|---|---|---|
| 3,320,535 | 5/1967 | Broadhead, Jr. | 325/329 |
| 3,181,122 | 4/1967 | Brown | 340/170 |
| 3,183,509 | 5/1965 | Ellett | 325/64 |
| 3,434,056 | 3/1969 | Becker | 325/65 |
| 3,445,593 | 5/1969 | Gray et al. | 340/170 |
| 3,450,842 | 6/1969 | Lipice | 179/15 P |

*Primary Examiner*—Robert L. Richardson
*Assistant Examiner*—Anthony H. Handal
*Attorneys*—R. J. Guenther and Kenneth B. Hamlin

ABSTRACT: A system is disclosed for detecting the presence of a received data signal in which a pair of band-pass filters is employed to separate out two pilot tones from the received signal. A mixer is employed to generate a difference frequency which drives a phase-locked oscillator system. The phase-locked oscillator system provides an output signal having the same frequency and phase as the average value of the difference signal. The phase relationship between the difference signal and the output from the phase-locked oscillator system is compared to provide a signal for enabling a data decoding circuit.

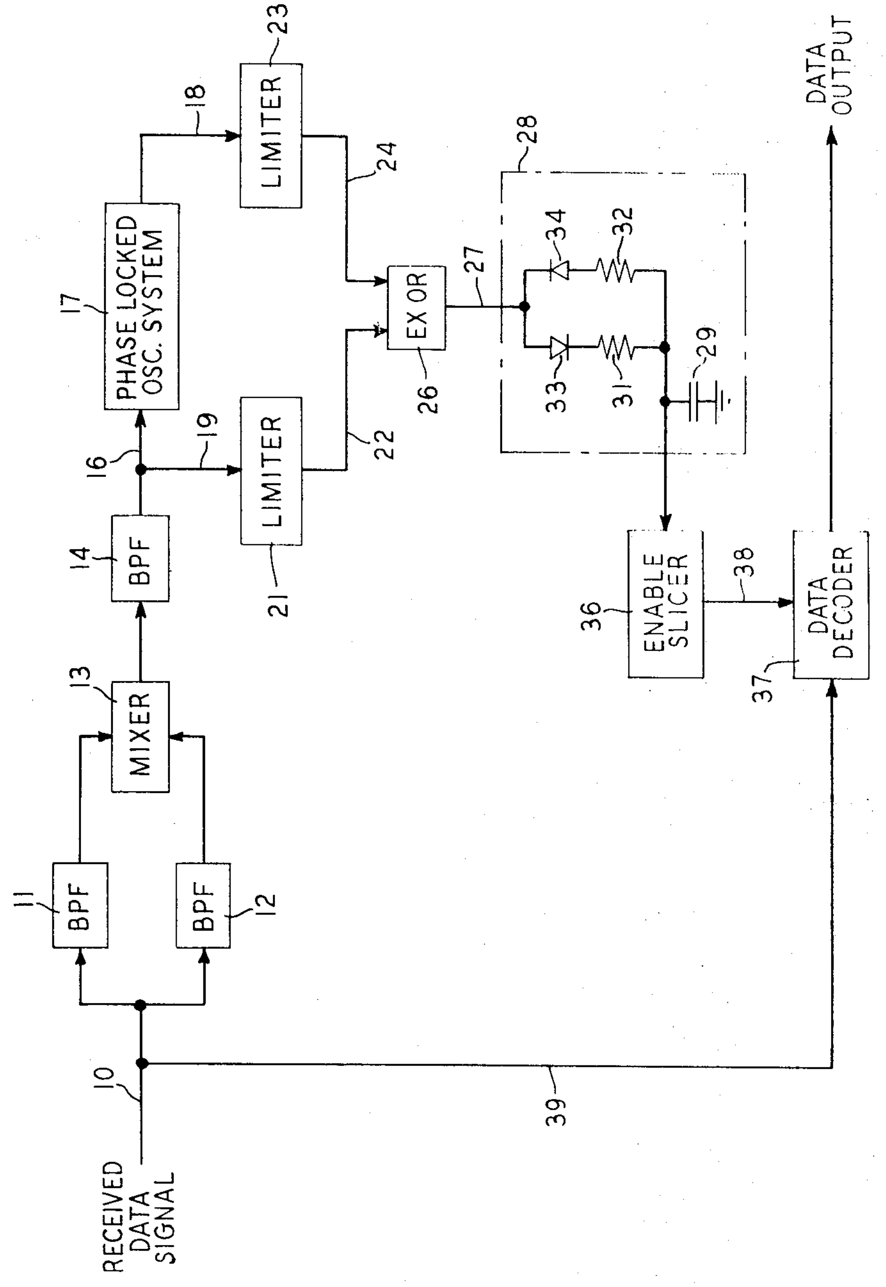
INVENTORS C.W. FARROW
L.N. HOLZMAN
BY [signature]
ATTORNEY

SYSTEM FOR DETECTING THE PRESENCE OF A RECEIVED DATA SIGNAL

FIELD OF THE INVENTION

This invention relates to a system for detecting the presence of a data signal at the input of a data receiver and particularly to a system for detecting the presence of a data signal at the input of a receiver by comparing the phase relationship between two received pilot tones.

BACKGROUND OF THE INVENTION

When a data signal is transmitted over a direct distance dialing telephone network, the data transmitting and receiving equipment must be capable of more than just providing and receiving, respectively, information bearing signals compatible with the telephone network. Additional circuitry must also be included for setting up and confirming that a connection has been made and that a signal arriving at the receiver is a data signal and not noise.

Many of the functions required of data transmitting and receiving equipment are analogous to functions performed by voice transmission and receiving equipment, others are not. When a voice call is set up and a person at the receiving station picks up the phone, he can readily tell if a valid connection has been made by speaking with the party at the other end of the connection or from the failure of anyone to respond. With a data call, this technique is unavailable for verifying the presence of a valid transmission.

If a data receiver responds to noise at its input, erroneous data would be accepted and passed on to an associated data-processing facility. Therefore, in some data sets, a minimum level of received signal is detected before the data receiver is enabled. This technique has been found highly susceptible to noise. Other data sets have been constructed in which a minimum signal is detected at a certain frequency or group of frequencies before the data receiver is enabled. These data sets, too, have been found highly susceptible to being enabled by noise signals.

BRIEF DESCRIPTION OF THE INVENTION

In accordance with this invention, a data receiver is arranged to receive a modulated data signal including two reference pilot tones having an accurately fixed coherent difference frequency. If the accurately fixed coherent difference frequency is detected over an interval, the data receiver is enabled for decoding the received data signal.

In a specific embodiment, a pair of bandpass filters is employed to separate out the two pilot tones. A difference frequency between the two pilot tones is derived and applied to a phase locked oscillator system. The phase locked oscillator system provides an output signal having the same frequency and phase as the average value of the difference signal. The phase relationship between the difference signal and the output from the phase locked oscillator system is compared to provide a control signal for enabling the data decoding circuits.

DESCRIPTION OF THE FIGURE

The sole FIGURE is a drawing partially in block diagram and partially in schematic form showing an enabling system constructed in accordance with the teachings of this invention.

DETAILED DESCRIPTION

The system shown in the sole FIGURE receives a modulated data signal accompanied by two pilot tones at an input terminal 10. One type of modulation scheme in which two pilot tones are transmitted with a modulated data signal is vestigial sideband modulation (VSB). Typically each pilot tone is placed to one side of the in-band VSB signal. The difference between the pilot tone frequencies is normally employed to reconstruct the carrier frequency at the receiver for homodyne demodulation.

A pair of bandpass filters 11 and 12 each having a passband to separate out one of the pilot tones is connected to the input terminal 10. The outputs from the bandpass filters 11 and 12 are applied to a mixer 13 which drives a bandpass filter 14 having a passband selected to pass the difference frequency between the two pilot tones.

The difference frequency from bandpass filter 14 is applied by a lead 16 to a phase locked oscillator system 17 having a relatively narrow band frequency onto which it can lock. A phase locked oscillator system such as phase locked oscillator system 17 provides a signal at its output having a frequency and phase related to the frequency and phase of an applied signal. The frequency and phase need not be the same. For example, a phase locked oscillator system may provide a signal at twice the frequency of the applied signal or in phase quadrature therewith. The phase locked oscillator system 17, however, provides an output signal on lead 18 having the same frequency and phase as the average frequency and phase of the signal on lead 16.

The phase locked system 17 has a time constant which is long compared with the period of the signal on lead 16. Therefore, if the signal on lead 16 has phase or frequency jitter around a mean phase or frequency, the signal on the lead 18 will have the mean phase and frequency.

Because of frequency jitter in telephone carrier systems, the pilot tones and thus he outputs of filters 11 and 12 may not be coherent, but because they are both affected by the same phase and frequency disturbances, their difference frequency out of mixer 13 and bandpass filter 14 is highly coherent—that is, to say that the same large number of cycles of tone at 16 will occupy vertically the same period of time. This coherence will not be maintained in the absence of pilot tones although noise alone may cause the bandpass filters 11 and 12 to have considerable signals on their outputs. In accordance with this invention, this coherence is detected by comparing the output of a phase locked oscillator with relatively long time delay to its noisy but nevertheless coherent input.

It should be noted that the term phase locked oscillator is a term of art and that systems employing fixed frequency oscillators and variable phase shifters serving the same function as other phase locked oscillator systems are considered phase locked oscillator systems.

The difference frequency on lead 16 is applied by lead 19 to a limiter 21 for providing a square wave signal on lead 22 having the same frequency and phase as the difference signal on lead 16. In a like manner, lead 18 applies the output from the phase locked oscillator system 17 to a limiter 23 for providing a square wave signal on lead 24 having the same frequency and phase as the signal from the phase locked oscillator system 17.

The signals on lead 22 and 24 are applied to an exclusive OR circuit 26 which serves as a phase comparator in this system When the signals on leads 22 and 24 are at the same level, a positive output appears on lead 27 at the output of exclusive OR circuit 26. When different levels appear on leads 22 and 24, a negative output appears on the lead 27.

The signal on lead 27 is integrated by nonlinear integrator 28 including capacitor 29, resistors 31 and 32 and diodes 33 and 34. When the signal on lead 27 is more positive than the signal on capacitor 29, the value of the voltage on capacitor 29 is increased by current passing through the diode 33 and resistor 31. When the voltage on lead 27 is less than the voltage is on capacitor 29, the voltage on capacitor 29 is decreased by current passing through diode 34 and resistor 32. In this embodiment, the value of the resistor 32 is considerably less than the value of the resistor 31. The voltage on the capacitor 29 will therefore decrease at a greater rate than it will increase. In this way the voltage on the capacitor 29 will tend towards a negative value unless the signals on leads 22 and 24 are the same for a considerably larger proportion of the time than they are different. The exact proportion is determined by the values of the resistors 31 and 32.

As pointed out previously, the phase locked oscillator system 17 provides a signal on lead 18 in phase with the signal on lead 16. If a different phase locked oscillator system were used which provided a different phase relationship, one would naturally substitute a different phase comparator for exclusive OR circuit 26 which would sense the desired phase relationship.

The voltage on capacitor 29 is fed to an enable slicer 36 which provides an enable signal to a data decoder 37 via lead 38 when the voltage on capacitor 29 is above a predetermined level. When the enable signal is not present the data decoder is disabled from providing an output signal. The enable slicer 36 has a built-in hysteresis to prevent the enable signal from going on and off in the presence of slight noise variations on the capacitor 29.

Therefore, it is seen that a system is provided which generates an enable signal on the lead 38 when the signals on leads 16 and 18 remain in appropriate phase relationship. If the phase relationship between signals on leads 16 and 18 were random (as would be the case where the phase of the signal on lead 16 were constantly changing), the data receiver would be disabled from providing an output signal. If noise having frequency content in the passbands of the filters 11 and 12 were incident upon the input terminal 10, the signal on lead 16 would have a constantly varying phase. Therefore, the above disclosed system can only enable the data decoder 37 in the presence of coherent pilot tones having a constant phase relationship therebetween at the input terminal 10. In addition, if the signal on lead 16 is not in the proper band for phase locked oscillator system 17 to lock on, there is no correlation between the signals on leads 16 and 18 and therefore no enabling signal appears on lead 38.

The data decoder 37 contains all the equipment commonly employed to demodulate and decode a received data signal applied to it from input terminal 10 by lead 39. Typically, a data decoder such as data decoder 37 would include carrier timing recovery circuits, demodulating circuits, sampling circuits, and equalizing circuits. The signal on the lead 18 from the phase locked oscillator system 17 may be employed to drive circuits in the data decoder 37.

It should be understood that various other embodiments and modifications can be made by those skilled in the art without departing from the spirit and scope of the invention.

I claim:

1. In a data receiver for receiving a modulated data signal including two accompanying pilot tones related by a fixed difference frequency, means for enabling said receiver in the presence of a valid message signal comprising
   - means for detecting the difference frequency between said pilot tones,
   - a phase locked oscillator system for providing a phase locked signal coherent in frequency and phase with said difference frequency, said phase locked oscillator system having a response time long compared to the period of said difference frequency and
   - means responsive to the occurrence of a constant phase relationship between said phase locked signal and the difference wave from said detecting means for unclamping said data receiver.

* * * * *